United States Patent [19]

Kolkman

[11] Patent Number: 5,344,359
[45] Date of Patent: Sep. 6, 1994

[54] APPARATUS FOR DRESSING AND SLAUGHTERED BIRD

[75] Inventor: Albert Kolkman, Oostzaan, Netherlands

[73] Assignee: Machinefabriek Meyn B.V., Noordeinde, Netherlands

[21] Appl. No.: 79,243

[22] Filed: Jun. 17, 1993

[30] Foreign Application Priority Data

Jun. 30, 1992 [NL] Netherlands ............... 9201168

[51] Int. Cl.⁵ ............................................. A22C 21/00
[52] U.S. Cl. ..................................... 452/174; 452/198; 426/513
[58] Field of Search ............... 452/174, 198; 426/513; 119/97.1, 97.2

[56] References Cited

U.S. PATENT DOCUMENTS

| | | | |
|---|---|---|---|
| 1,980,904 | 11/1934 | Botz | 452/174 |
| 2,560,067 | 7/1951 | Bell | 452/174 |
| 3,082,475 | 3/1963 | Belknap | 452/174 |
| 4,339,847 | 7/1982 | Niccolls | 452/174 |

FOREIGN PATENT DOCUMENTS 0350399  1/1990  European Pat. Off. .
2522475  9/1983  France .

OTHER PUBLICATIONS

Foreign Search Report With Translation.

*Primary Examiner*—Willis Little
*Attorney, Agent, or Firm*—Dority & Manning

[57] ABSTRACT

The invention relates to an apparatus for dressing a slaughtered bird, especially for positioning each wing tip underneath the upper arm. Preferably the apparatus comprises first means for confining the wing tip in a starting position, second means for moving the wing tip from this starting position towards an intermediate position and third means for moving the wing tip with its end from said intermediate position towards a position underneath the upper arm. As first means confinement plates may be used, as second means a pivot plate and as third means a pressure means engaging the wing tip.

12 Claims, 4 Drawing Sheets

//5,344,359//

APPARATUS FOR DRESSING AND SLAUGHTERED BIRD

BACKGROUND OF THE INVENTION

The present invention relates to an apparatus for dressing a slaughtered bird.

In order to provide slaughtered birds with an attractive appearance they are "dressed", which means positioned and packaged in a special way. Among others this comprises giving the wings a special position especially close to the body of the bird. In a known method the wings are tied up against the body of the bird.

OBJECTS AND SUMMARY OF THE INVENTION

It is an object of the invention to provide an apparatus for dressing a slaughtered bird, with which the wings can be placed in a desired position relative to the bird without the need of being tied up. Additional objects and advantages will be set forth in part in the following description, or may be obvious from the description, or may be learned by practice of the invention.

Thus the apparatus according the invention is characterized by elements for, starting from the side of the shoulder of the bird, positioning each wing tip with its end underneath the upper arm of the bird.

In a natural, relaxed situation the wings of a slaughtered bird are slightly spreaded, wherein the upper arm and the second wing member substantially extend in the same plane, whereas the wing tip extends substantially perpendicularly to this plane. Using the apparatus according to the invention, the wing tip, starting from the side of the shoulder, is positioned with its end underneath the upper arm. The wing obtains a forced position in which the wing tip clampingly engages the upper arm. As a result this position of the wing tip is maintained without additional means.

In a preferred embodiment of the apparatus according to the invention the elements comprise first means for confining the wing tip in a starting position, second means for moving the wing tip from this starting position in which it extends substantially perpendicularly to the plane of the upper arm and the second wing member towards an intermediate position in which it extends substantially in said plane, and third means for moving the wing tip with its end from the intermediate position towards a position underneath the upper arm.

Using the first, second and third means offering the wing tips the desired position relative to the upper arms occurs in three successive steps.

In a preferred embodiment of the apparatus according to the invention, the first means comprise two confinement plates positionable at opposite sides of the wing tip and movable towards each other. With the aid of these confinement plates, a reproducible positoning of the wing tip relative to the second means occurs.

In this aspect, it is possible that one of the confinement plates is slidable in parallel with its plane and is movable substantially perpendicularly to its plane towards and away from the other confinement plate. In a position in which the confinement plates are distanced further relative to each other, they can easily be positioned at opposite sides of the wing tip while taking account for variations of the starting position of the wing tip resulting from anatomical differences. By moving the confinement plates towards each other, a confinement of the wing tip occurs. The slideability of the one confinement plate offers advantages in view of optimally confining the wing tip without being hindered by other elements of the apparatus.

Another preferred embodiment of the apparatus according to the invention is characterized in that the second means comprises a pivot plate which is pivotable around an axis directed substantially perpendicular to the confinement plates. With this pivot plate, the wing tip can be pivoted from its starting position, which is defined by the position of the confinement plates, towards the intermediate position, which is positively determined through the pivot plate.

In a further preferred embodiment of the apparatus, the third means comprises a pressure means engaging the wing tip. It is possible that the pressure means is mounted on an activating means, such as a cylinder-piston assembly or the like, and is provided with a recess for at least partially receiving the joint between the wing tip and the adjoining second wing member. Using the pressure means, the end of the wing tip is pushed underneath the upper arm such that the bird obtains the desired dressed position at its wings. The recess in the pressure means provides for a good centering of the joint between the wing tip and the second wing member relative thereto, such that the risk of the pressure means passing the wing tip is minimized. Finally it is handy, when the apparatus according to the invention is provided with positioning means for positioning the slaughtered bird relative to the wing tip engaging means. These positioning means may comprise supporting plates supporting the wings and selectively activatable clamping means clamping the wings onto said plates.

Hereinafter the invention will be elucidated further referring to the drawing, in which an embodiment of the apparatus according to the invention is illustrated.

DETAILED DESCRIPTION OF THE PREFERRED EMBODIMENTS

Figure 1:
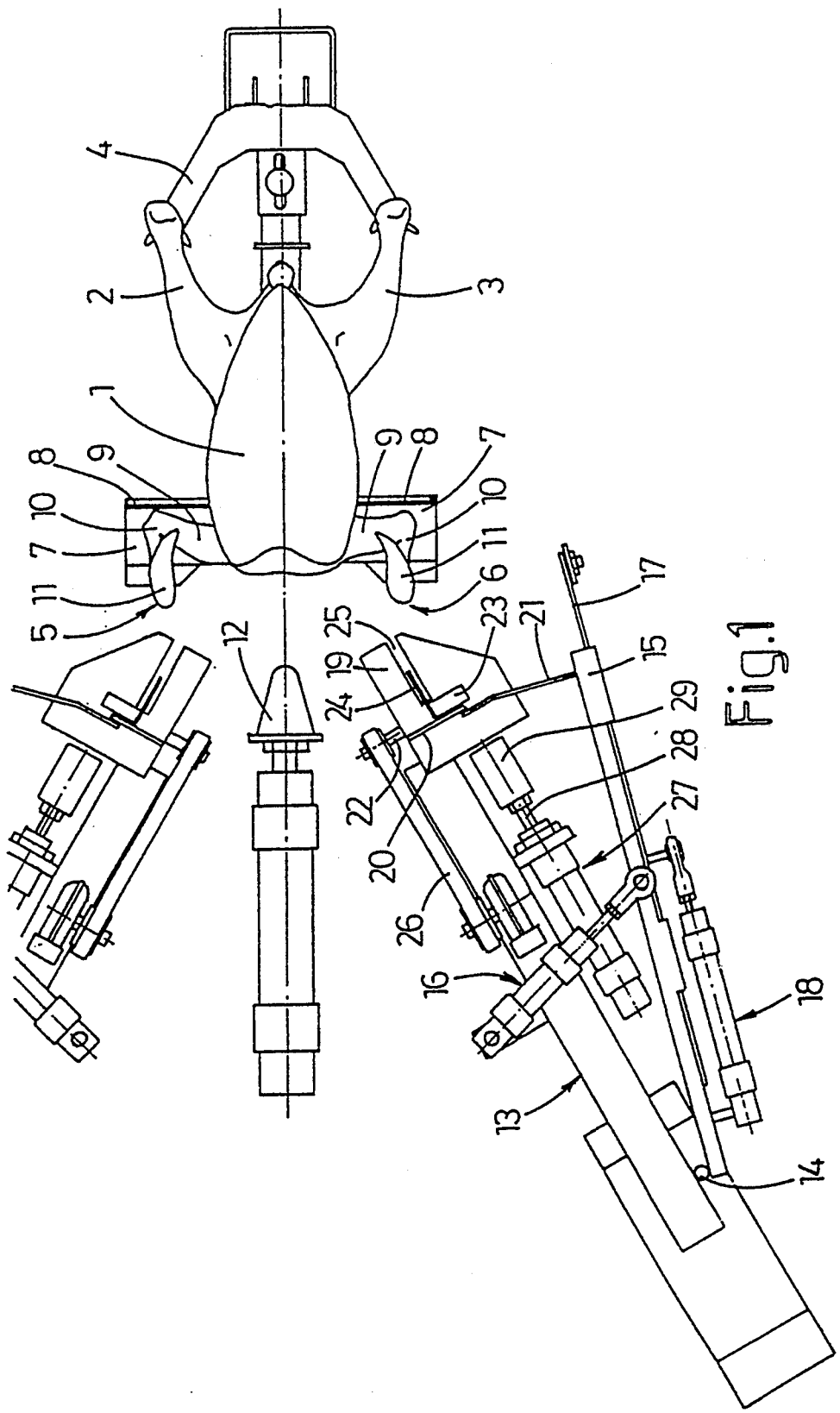
FIG. 1 shows schematically, and partially, a top plan view of an embodiment of the apparatus according to the invention in a starting position.

Reference will now be made in detail to the presently preferred embodiments of the invention, one or more embodiments of which are illustrated in the drawings. The description of the invention is for purposes of explaining the invention, and is not a limitation of the invention. The numbering of components is consistent throughout the description, with the same components having the same number.

In the top plan view according to FIG. 1, one can see a bird 1 of which the wings have to be dressed. With its legs 2, 3 the bird is placed in recesses of a plate 4. The wings 5, 6 are supported by support plates shaped as angled plates, having a horizontal first flange 7 and an adjoining vertical second flange 8 (see also FIG. 4a).

Each wing 5, 6 of a bird to be dressed comprises an upper arm 9 joining the body, a second wing member 10 connected therewith and finally the wing tip 11. In the position in which the bird 1 is supported by the first flange 7 and the second flange 8, the upper arms 9 and second wing members 10 are resting onto the first flange 7 while substantially extending in a horizontal plane, whereas the wing tips 11 substantially extend upwards perpendicularly to said plane (see also FIG. 4a).

The support plate comprising first flange 7 and second flange 8 and the plate 4 receiving the legs 2, 3 may be part of a conveyor carrying a large number of such positioning means, each being meant for receiving a slaughtered bird. Using such a conveyor, the birds to be dressed are supplied one by one to the present apparatus.

Such positioning means further may comprise a positioning means 12 engaging the neck stub of the bird 1, said means being attached to the conveyor or otherwise.

The apparatus comprises two supporting arms, of which in FIG. 1 only one is represented entirely and has been indicated by reference number 13. The other supporting arm, not indicated entirely, is provided with parts which correspond with, but are a mirror image of the members to be described hereinafter which are provided on the supporting arm 13.

By means not shown further, the supporting arm 13 can be moved longitudinally in its entirety. Attached to the supporting arm 13 there is a pivot arm 15 which, driven by a cylinder-piston asembly 16, is pivotable around a pivot axis 14 extending perpendicularly to the plane of the drawing. The pivot arm 15 carries a frst confinement plate 17 which is longitudinally slidable relative thereto. The shift of the first confinement plate 17 relative to the pivot arm 15 is caused by a cylinder-piston assembly 18. At the foremost end of the supporting arm 13 a horizontal plate 19 is attached. This horizontal plate 19 carries a vertical stationary guide plate 20 extending perpendicularly to the plane of the drawing. A movable guide plate 21 cooperating with the stationary guide plate 20 is attached to the pivot arm 15.

A pivot plate 23 can rotate around a horizontal rotation axis 22 mounted in the end of the supporting arm 13. In FIG. 1 the pivot plate 23, which extends in parallel to the rotation axis 22, is positioned substantially perpendicularly to and above the horizontal plate 19. Perpendicularly to this pivot plate 23, and therefore perpendicularly to the rotation axis 22, a second confinement plate 24 is attached thereto, which together with the pivot plate 23 may move in its own plane. For enabling this movement of the second confinement plate 24, the horizontal plate 19 is provided with a slot 25.

The activation of the rotation axis 22 occurs through a transmission, such as a belt 26, which in a way not shown further is driven by a motor or alike.

FIG. 1 further shows, that a cylinder-piston assembly 27 is mounted on the supporting arm 13, which assembly carries a pressure means 29 at the free end of its piston rod 28. This pressure means 29 can be moved along the plate 19 (and possibly through appropriate recesses in the guide plates 20 and 21) into the direction of the foremost end of the supporting arm.

In FIG. 1 the situation is represented in which, by the conveyor (not illustrated), a bird has been placed in the appropriate position relative to the apparatus, just before the positioning means 12 will be moved towards the neck stub of the bird. The supporting arm 13 and all parts attached thereto are in a resting position.

In order to be able to carry out the dressing operation of the bird 1, clamping means are attached to the wings 5, 6, said clamping means comprising rounded ends 30 of piston rods 31. This is shown clearly in FIG. 2a which illustrates a section according to line 2a—2a in FIG. 2.

Figure 2:
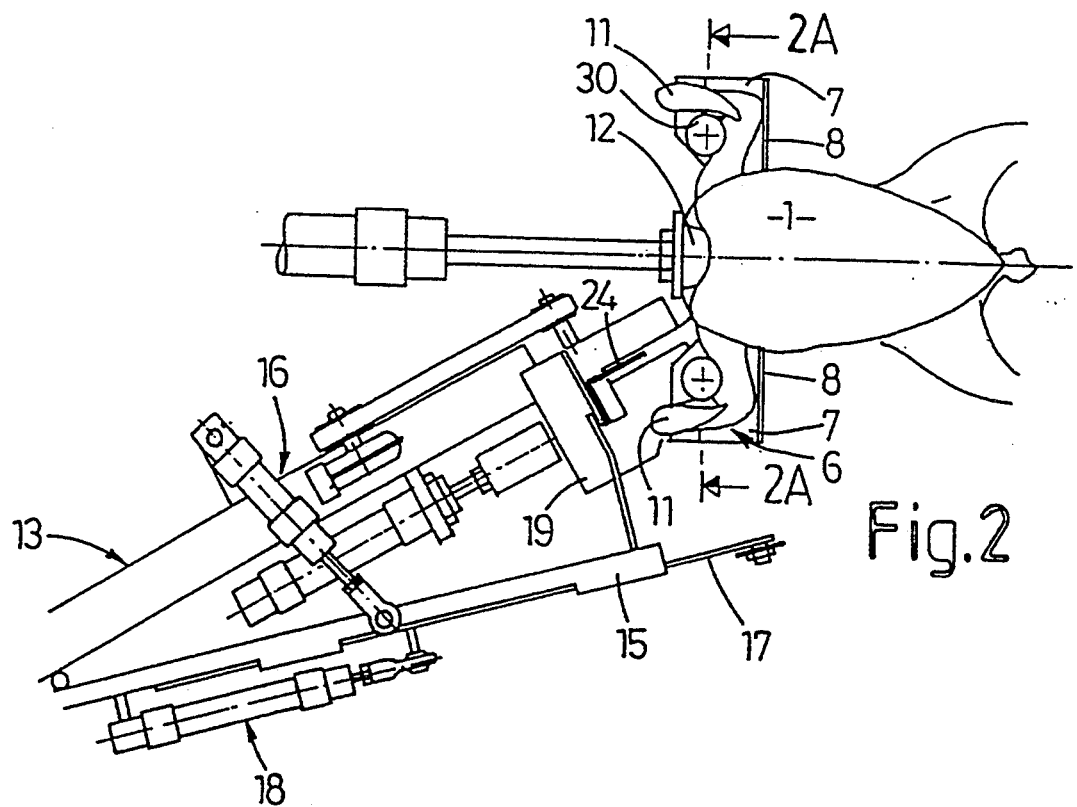
FIG. 2 shows the apparatus of FIG. 1 in a second position, in which a bird to be dressed is positioned relative to the apparatus.
Figure 2A:
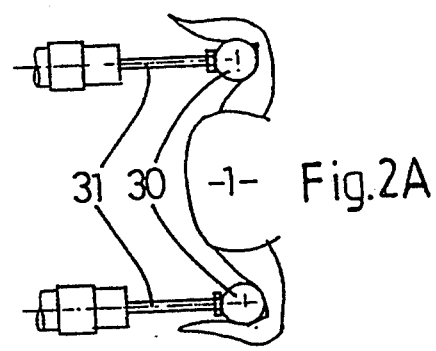
FIG. 2a shows a section according to line 2a—2a in FIG. 2.

FIG. 2 demonstrates that the positioning means 12 has engaged the neck stub of the bird 1. The supporting arm 13 has been shifted in its entirety towards the respective wing 6, such that the horizontal plate 19 with its foremost end is positioned just underneath the first flange 7 of the supporting plate. Relative to the supporting arm 13 the remaining parts are in the positions as described in connection with FIG. 1.

Figure 3:
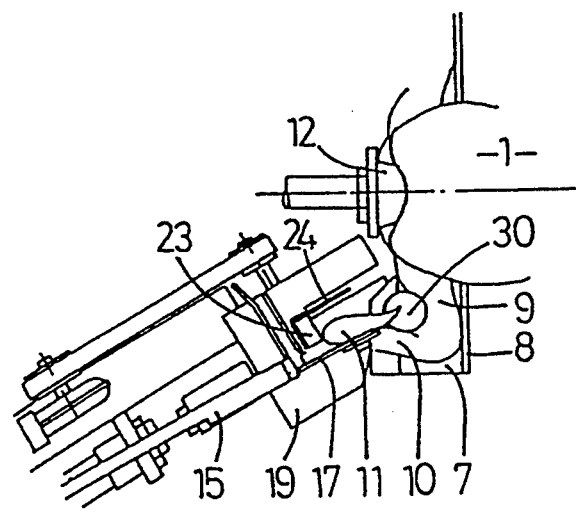
FIG. 3 shows closing of the confinement plates.

Next, through an activation of the cylinder-piston assembly 18, the first confinement plate 17 is shifted inwards relative to the pivot arm 15, that is to the left in FIG. 2. Then the cylinder-piston assembly 16 is activated and the pivot arm 15 is pivoted for reducing the angle between itself and the supporting arm 13. Thus the first confinement plate 17 will engage the upwardly extending wing tip 11 and will move it towards the second confinement plate 24. This movement is indicated in FIG. 3. Because the first confinement plate 17 is shifted inwardly relative to the pivot arm 15, the first confinement plate 17 can pass the clamping means 30 without any problem.

Figure 4:
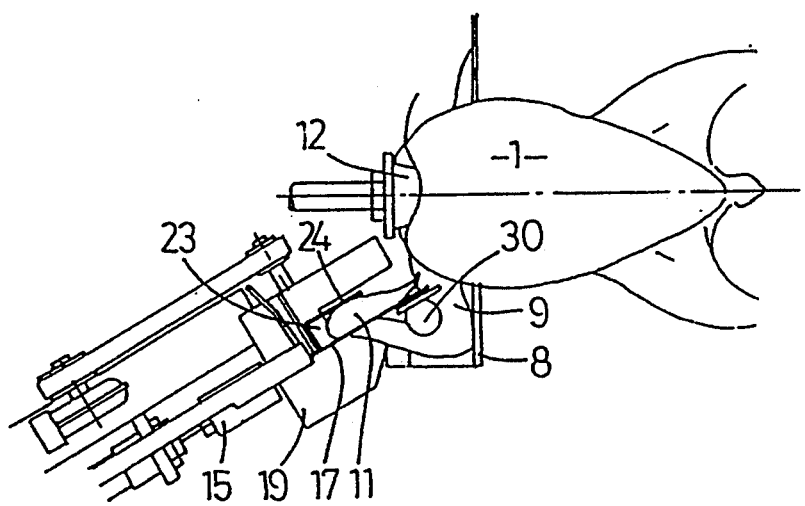
FIG. 4 shows the situation in which the confinement plates have confined the wing tip.
Figure 4A:
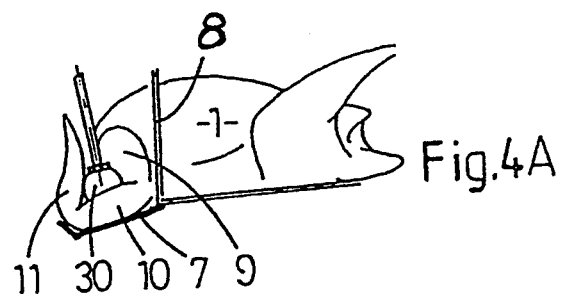
FIG. 4a shows a side elevational view of the situation illustrated in FIG. 4.

After the first confinement plate 17 is pivoted past the clamping means 30 and has confined the wing tip 11 between itself and the second confinement plate 24, the first confinement plate 17 again is extended relative to the pivot arm 15, thus reaching the position shown in FIG. 4. In this position the upper arm 9 and the second wing member 10 of the bird still substantially are positioned in a horizontal plane, whereas the wing tip 11, positioned between both confinement plates 17 and 24, extends substantially upwards (perpendicularly to the plane of the drawing). Now the clamping means 30 can be removed.

Figure 5:
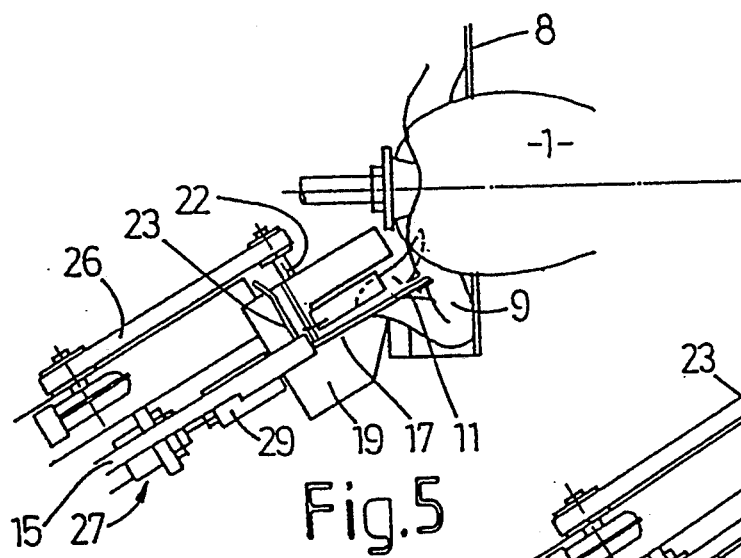
FIG. 5 shows pivoting of the wing tip.

Next an activation of the rotation axis 22 through the belt 26 occurs, such that the initially vertically directed pivot plate 23 will pivot forwardly (that is towards the body of the bird 1) and will engage the wing tip 11, which with its foremost end is pivoted past the upper arm 9. The position reached then is indicated in FIG. 5.

While pivoting the wing tip 11 remains confined between the second confinement plate 24 rotating along with the pivot plate 23 and the first confinement plate 17.

Figure 6:
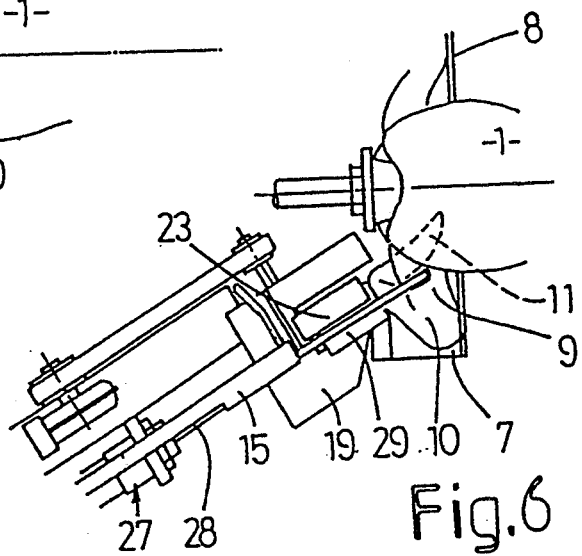
FIG. 6 shows the activation of the pressure means engaging the wing tip.

After the wing tip 11 has been rotated with its foremost end past the upper arm 9 in such a way, the cylinder-piston assembly 27 is activated and the piston rod 28 presses the pressure means 29 against the joint between the second wing member 10 and the wing tip 11. For this the pressure means 29 is provided with a recess not shown, in which a correct centering of the mentioned joint occurs. Through an ongoing foreward motion of the pressure means 29 towards the bird, finally the second wing member 10 is almost entirely pushed underneath the upper arm 9 (and possibly underneath the body) of the bird 1. The position reached then is clearly indicated in FIG. 6.

Figure 7:
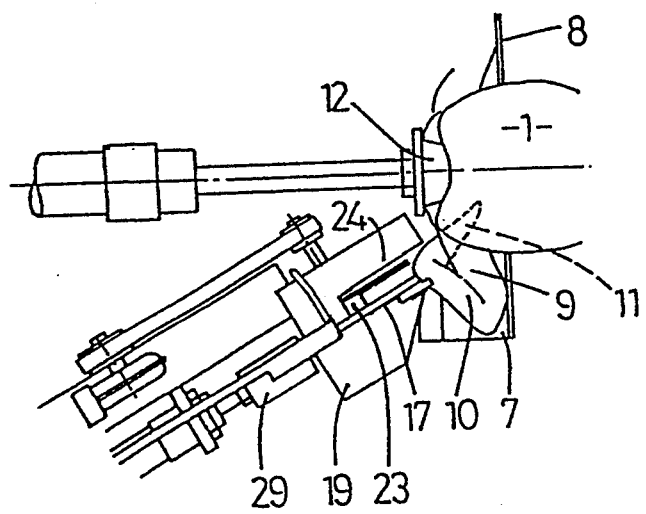
FIGS. 7 and 8 show successive situations during returning the apparatus towards the starting position.
Figure 8:
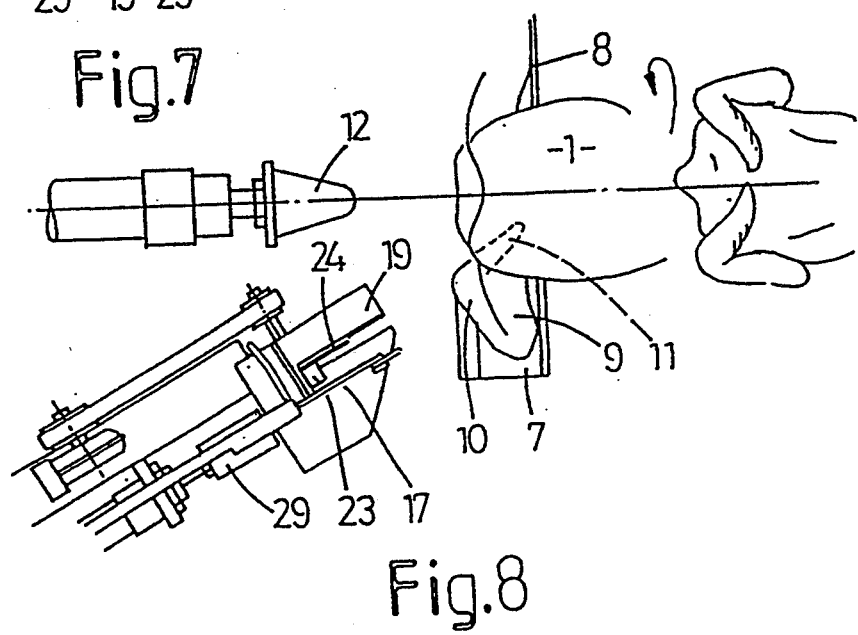

Finally, in accordance with FIGS. 7 and 8, the withdrawal of the supporting arm 13 and parts attached thereto occurs, whereafter the respective parts on the supporting arm 13, after releasing the respective wing, can return towards their original starting position indicated in FIG. 1. Further the positioning means 12 releases the neck stub of the bird, whereafter the conveyor can discharge the bird while a new bird to be dressed is positioned relative to the apparatus.

At the rightmost end of FIG. 8, a schematical bottom view of a bird is illustrated, of which the wings have been dressed in the way described before, wherein the wing tips 11 are positioned underneath the upper arm or body, respectively, of the bird.

The invention is not limited to the embodiment described before, which may be varied widely within the scope of the invention as defined by the claims. In fact, it will be apparent to those skilled in the art that various modifications and variations can be made in the invention without departing from the scope or spirit of the invention. It is intended that the present invention cover such modifications and variations.

I claim:

1. An apparatus for dressing a slaughtered bird, particularly the wings of the bird, said apparatus comprising:
   a first manipulating device operably configured for positioning and confining the wing tip in a starting position wherein the wing tip extends substantially perpendicular to the plane of the upper arm of the wing;
   a second manipulating device operably configured for engaging the wing tip in said starting position and positioning the wing tip into an intermediate position wherein the wing tip extends substantially in the plane of the upper arm of the wing; and
   a third manipulating device operably configured for engaging the wing tip in said intermediate position and positioning the wing tip into a final position wherein the wing tip extends underneath the upper arm of the wing.

2. The apparatus as in claim 1, wherein said first manipulating device comprises two moveable confinement plates positionable on opposite sides of the wing tip, said confinement plates moveable towards each other to confer the wing tip therebetween.

3. The apparatus as in claim 2, wherein one of said confinement plates is slidable in a plane essentially parallel to the other said confinement plate and is moveable perpendicularly relative said other confinement plate.

4. The apparatus as in claim 2, wherein one of said confinement plates is slidably mounted on a pivot arm, said pivot arm being pivotal relative to a supporting arm supporting the other said confinement plate.

5. The apparatus as in claim 2, wherein said second manipulating device comprises a pivot plate, said pivot plate being pivotable about an axis which is substantially perpendicular to a plane through said confinement plates for forcing the wing tip into said intermediate position as the wing tip is confined by said confinement plates.

6. The apparatus as in claim 1, wherein said third manipulating device comprises a pressure device configured for pushing the wing tip from said intermediate position to said final position under the arm of the wing.

7. The apparatus as in claim 6, wherein said pressure device comprises a displaceable arm, said arm having a recess defined in the end thereof engaging the wing tip for receiving a portion of the wing tip.

8. The apparatus as in claim 7, further comprising a cylinder-piston assembly configured for actuating said displaceable arm.

9. The apparatus as in claim 1, further comprising a positioning device configured for positioning the slaughtered bird relative said manipulating devices.

10. The apparatus as in claim 9, wherein said positioning device comprises a support plate and an actuable clamping device, said clamping device being selectively actuable for clamping the wing to said support plate.

11. The apparatus as in claim 10, wherein said clamping device comprises a displaceable rod member, said rod member being selectively moveable back and forth relative said support plate.

12. The apparatus as in claim 10, wherein said positioning device is configured on an endless conveyor, said conveyor comprising a plurality of said positioning devices for supplying slaughtered birds to said manipulating devices.

* * * * *